United States Patent
Kikuchi

(10) Patent No.: US 8,805,174 B2
(45) Date of Patent: Aug. 12, 2014

(54) IMAGE TAKING SYSTEM AND OPERATING APPARATUS

(71) Applicant: Canon Kabushiki Kaisha, Tokyo (JP)

(72) Inventor: Takayuki Kikuchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/790,430

(22) Filed: Mar. 8, 2013

(65) Prior Publication Data

US 2013/0188942 A1    Jul. 25, 2013

Related U.S. Application Data

(62) Division of application No. 13/106,347, filed on May 12, 2011.

(30) Foreign Application Priority Data

May 14, 2010    (JP) .................................. 2010-112325

(51) Int. Cl.
    *G03B 13/34*    (2006.01)
(52) U.S. Cl.
    USPC ........................................................ 396/131
(58) Field of Classification Search
    USPC .................................................. 396/79, 131
    See application file for complete search history.

(56) References Cited

U.S. PATENT DOCUMENTS

| 5,325,145 | A  | 6/1994 | Hirasawa |
| 7,092,027 | B1 | 8/2006 | Mizumura |
| 2007/0014559 | A1 | 1/2007 | Natsume |
| 2008/0084495 | A1 | 4/2008 | Hirai |

FOREIGN PATENT DOCUMENTS

| JP | H08-334674 A | 12/1996 |
| JP | H09-133852 A | 5/1997 |
| JP | 2000-032304 A | 1/2000 |
| JP | 2003-149535 A | 5/2003 |

*Primary Examiner* — Clayton E Laballe
*Assistant Examiner* — Fang-Chi Chang
(74) *Attorney, Agent, or Firm* — Rossi, Kimms & McDowell LLP

(57) ABSTRACT

An image taking system including: a lens apparatus; a first and a second operating apparatus, the first and the second operating apparatus configured to output a command information for an optical member movable in the lens apparatus, and the lens apparatus includes: a driving unit for the optical member; and a lens controller for driving the optical member based on a command from the first and the second operating apparatus, wherein the first operating apparatus includes: an operating unit; and a demand controller for outputting, to the lens controller, an information for driving the optical member, and wherein the demand controller outputs a position command information for the optical member to the lens controller when the operating unit being operated, and outputs other information for the optical member to the lens controller when the operating unit not being operated.

2 Claims, 9 Drawing Sheets

IMAGE TAKING SYSTEM AND OPERATING APPARATUS

BACKGROUND OF THE INVENTION

1. Field of the Invention

The present invention relates to an image taking system in which multiple operating apparatuses are connected, and driving of a movable optical member is controlled according to commanding signals from the multiple operating apparatuses. The present invention also relates to the operating apparatus.

2. Description of the Related Art

Conventionally, many models of broadcast image taking systems are configured to have operating apparatuses for operating focusing and zooming as other systems which are separate from a lens system. This is to allow selecting an optimum operating unit in various image taking situations. For example, as described in Japanese Patent Application Laid-Open No. H08-334674, some operating apparatuses are provided with a shot switch for moving the zoom position and the focus position to positions stored in advance, in addition to the zoom thumb ring and the focus knob used for moving the zoom position and the focus position, respectively, in synchronization with operations thereof. Further, in the case of such an image taking system that the lens system and the camera system are detachable, an operation commanding signal may be input also from the camera system as described in Japanese Patent Application Laid-Open No. 2000-032304.

Further, Japanese Patent Application Laid-Open No. 2003-149535 discloses the uniaxial two-operation type controller and the zoom and focus operating apparatuses.

Further, in recent years, for the purpose of 3D image taking, there has been a demand that multiple lenses be operated by the same operating apparatus, as described in Japanese Patent Application Laid-Open No. H09-133852.

In Japanese Patent Application Laid-Open No. H09-133852, in order to reduce an error in zoom position between the left and right lens systems used for the 3D image taking, the driving speed is adjusted based on a difference value obtained from the position information of the respective lens systems. However, due to a delay time of the position information, a process of high accuracy is required.

As operation commanding signals to be generated by the operating apparatuses, there are a position command which specifies the target positions of zoom and focus lenses (also referred to as position control) and a speed command which specifies the moving direction and the moving speed (also referred to as speed control). When multiple lenses are to be moved to substantially the same positions, it has an advantage to give an operation command through the position commanding control. Thus, some zoom operating apparatuses are configured to convert the speed command of the operating apparatus into the position command and then, output the command to the lens system.

In the case where the zoom operating apparatus transmits the position command, there are the following problems.

For example, the following case is assumed. That is, the focus operating apparatus provided with the zoom shot switch function as in Japanese Patent Application Laid-Open No. H08-334674 and the position command zoom operating apparatus are connected to the lens apparatus. In this case, the zoom position commanding signal is transmitted from the position command zoom operating apparatus at constant periods, and hence, even if the zoom shot command is transmitted once, the zoom shot command is then canceled due to the zoom position commanding signal transmitted thereafter. In short, there is a problem that the zoom driving cannot be effected by means of the zoom shot switch.

Japanese Patent Application Laid-Open No. 2000-032304 discloses a changeover between the speed commands provided from the camera system and the operating apparatus, which is performed by making a judgment regarding a neutral level of the commanding values. However, this technique cannot be applied to the changeover of the position commanding signals.

Further, Japanese Patent Application Laid-Open No. 2003-149535 discloses the provision of an operation apparatus changing switch so as to allow the operation to be changed over between the uniaxial two-operation type controller giving the zoom position command and the zoom operating apparatus giving the zoom speed command, and also discloses that either the uniaxial two-operation type controller or the zoom operating apparatus which is operated is selected. However, performing the changeover by using the changeover switch is troublesome to an operator, and also, in order to automatically select the operated operating apparatus, the configuration of the lens apparatus needs to be changed.

SUMMARY OF THE INVENTION

According to the present invention, there is provided an image taking system including: a lens apparatus; a first operating apparatus; and a second operating apparatus, in which the first operating apparatus and the second operating apparatus each are configured to output a command information for driving an optical member which is movable and is included in the lens apparatus, in which the lens apparatus includes: a driving unit for driving the optical member; and a lens controller for controlling the driving unit based on the command information from the first operating apparatus and the second operating apparatus, in which the first operating apparatus includes: an operating unit to be operated by an operator; and a demand controller for outputting, to the lens controller, an information for driving the optical member based on an operation amount of the operating unit, and in which the demand controller outputs position command information for the optical member to the lens controller based on the operation amount of the operating unit when the operating unit is being operated and outputs an information other than the position command information for the optical member to the lens controller when the operating unit is not being operated.

Further, according to the present invention, there is provided an operating apparatus for outputting a command information for driving an optical member which is movable and is included in a lens apparatus, including: an operating unit to be operated by an operator; and a controller for outputting, to the lens apparatus, an information for driving the optical member based on an operation amount of the operating unit, in which the controller outputs position command information for the optical member to the lens apparatus based on the operation amount of the operating unit when the operating unit is being operated, and outputs an information other than the position command information for the optical member to the lens apparatus when the operating unit is not being operated.

According to the present invention, multiple operating apparatuses including an operating apparatus for outputting the position command information can be used concurrently, and the lens operation can be effected through the operating apparatus which is being operated.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
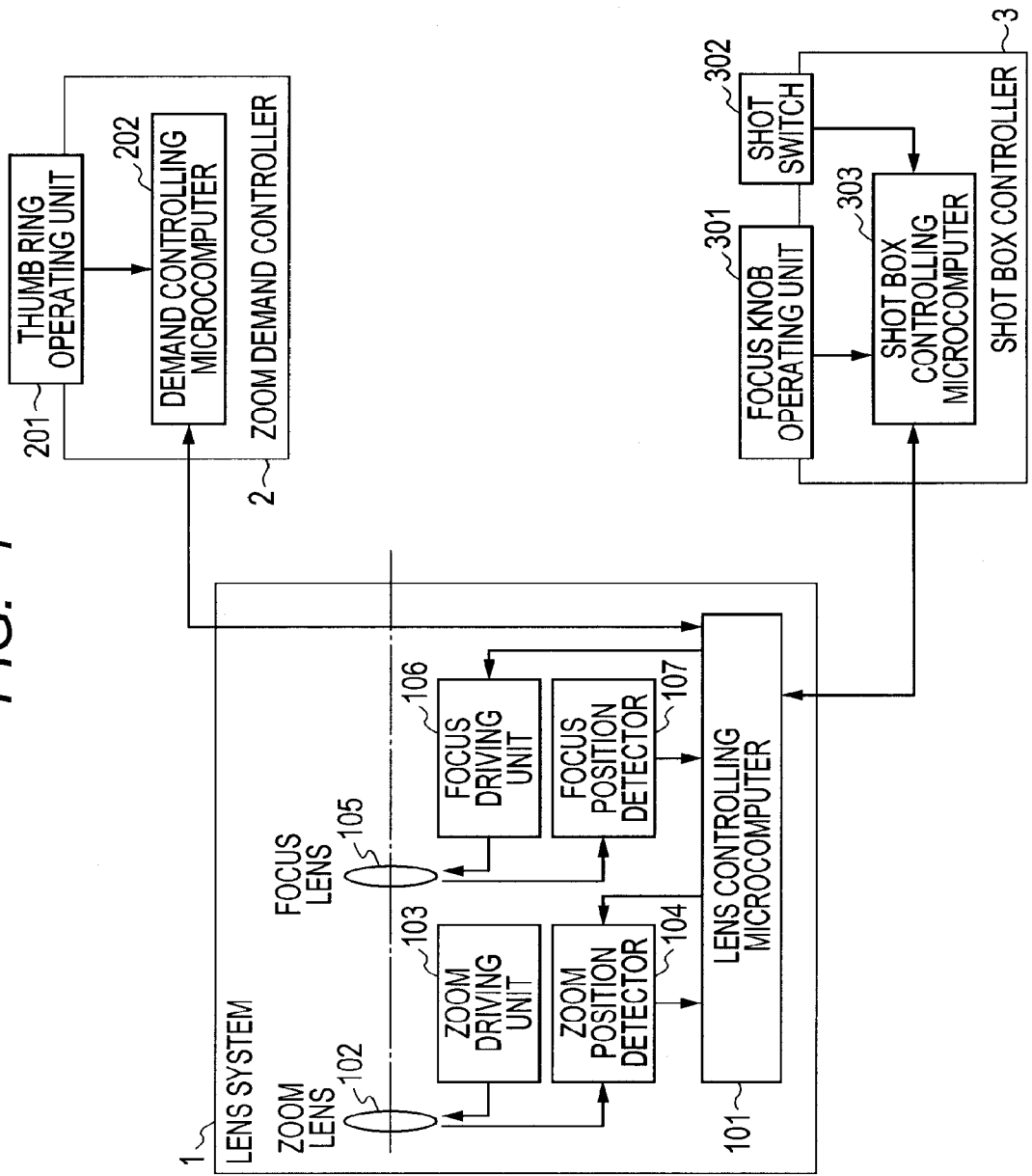
FIG. 1 is a block diagram of a first embodiment.

FIG. 1 is a block configuration diagram illustrating an image taking system which best represents features of the present invention.

The image taking system includes a lens system 1, a zoom demand controller 2 which is to be connected to the lens system 1 and used for operating zooming, and a shot box controller 3 which is to be connected to the lens system 1 and used for performing focus operation and shot operation.

The lens system 1 includes: an optical system including a zoom lens 102 for varying an optical magnification and a focus lens 105 for changing a position of focus, which are movable optical members; and a lens controlling microcomputer 101 which serves as a lens controller for controlling the lens system 1 as a whole. The zoom lens 102 is moved by a zoom driving unit 103 in response to a command from the lens controlling microcomputer 101. The position of the zoom lens 102 is detected by a zoom position detector 104, and the detected position is then output to the lens controlling microcomputer 101. The focus lens 105 is moved by a focus driving unit 106 in response to a command from the lens controlling microcomputer. The position of the focus lens 105 is detected by a focus position detector 107, and the detected position is then output to the lens controlling microcomputer 101.

The zoom demand controller 2, which is a first operating apparatus, includes a thumb ring operating unit 201 through which an operator performs zoom operation, and a demand controlling microcomputer 202 which serves as a demand controller for transmitting operation amount information of the thumb ring operating unit 201 to the lens system 1 by performing communication to the lens controlling microcomputer 101.

The shot box controller 3, which is a second operating apparatus, includes a focus knob operating unit 301 through which the operator gives a focus operation command, a shot switch 302 for performing an operation of moving the lenses to zoom and focus positions stored in advance, and a shot box controlling microcomputer 303 for transmitting operation amount information of the focus knob operating unit 301 and operation information of the shot switch 302 to the lens system 1 by performing communication with the lens controlling microcomputer 101.

Note that, a camera system for generating image signals is further to be connected to the lens system 1, but description thereof is omitted in this embodiment.

Operation of the image taking system having the above-mentioned configuration is described. In actuality, the zoom operation and the focus operation are controlled separately. However, the gist of this proposal relates to a changeover method used when one lens is operated through multiple operating units, and hence only an operation of controlling the movement of the zoom lens 102 is herein described.

Figure 2:
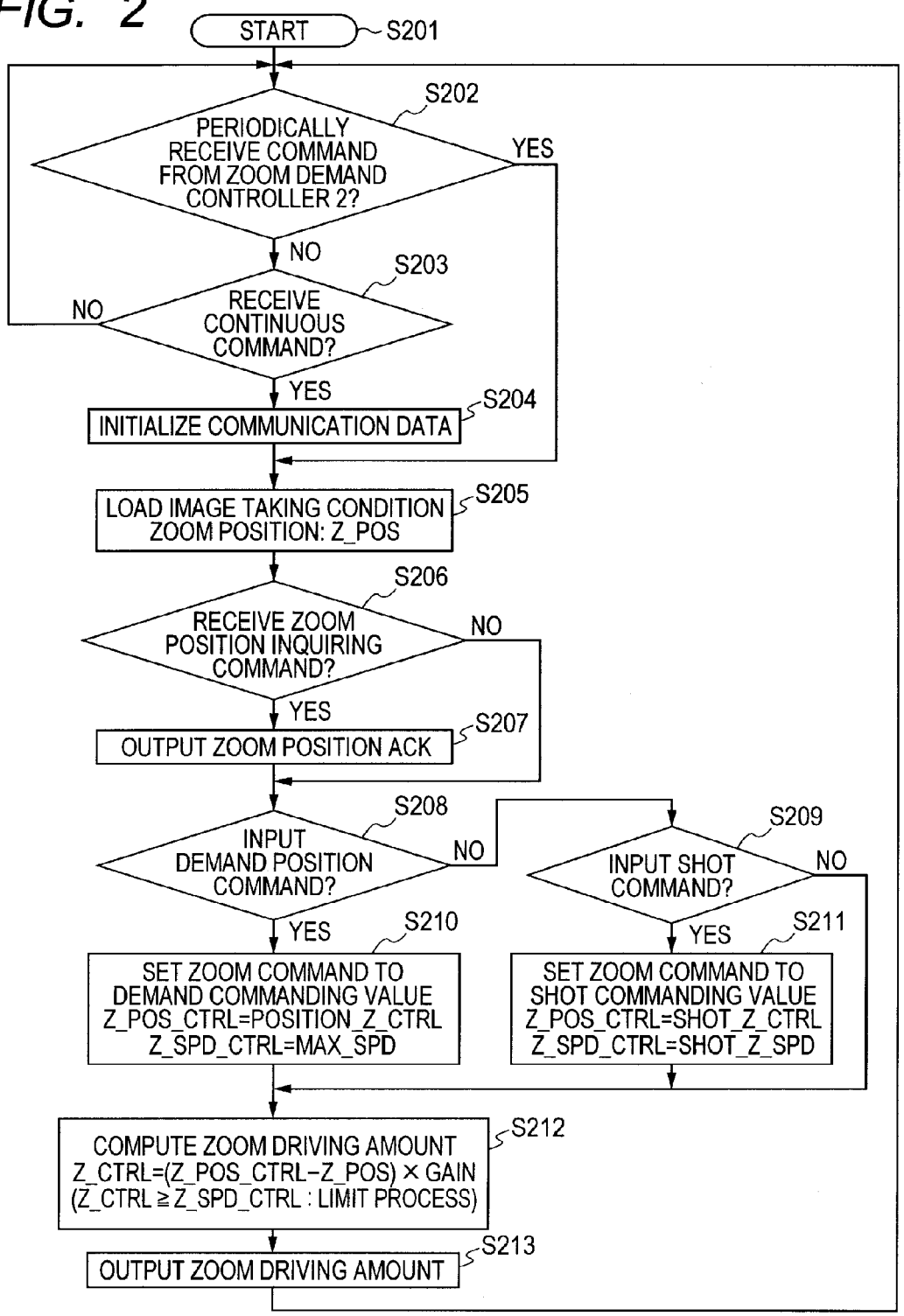
FIG. 2 is a flow chart of a lens system of the first embodiment.
Figure 3:
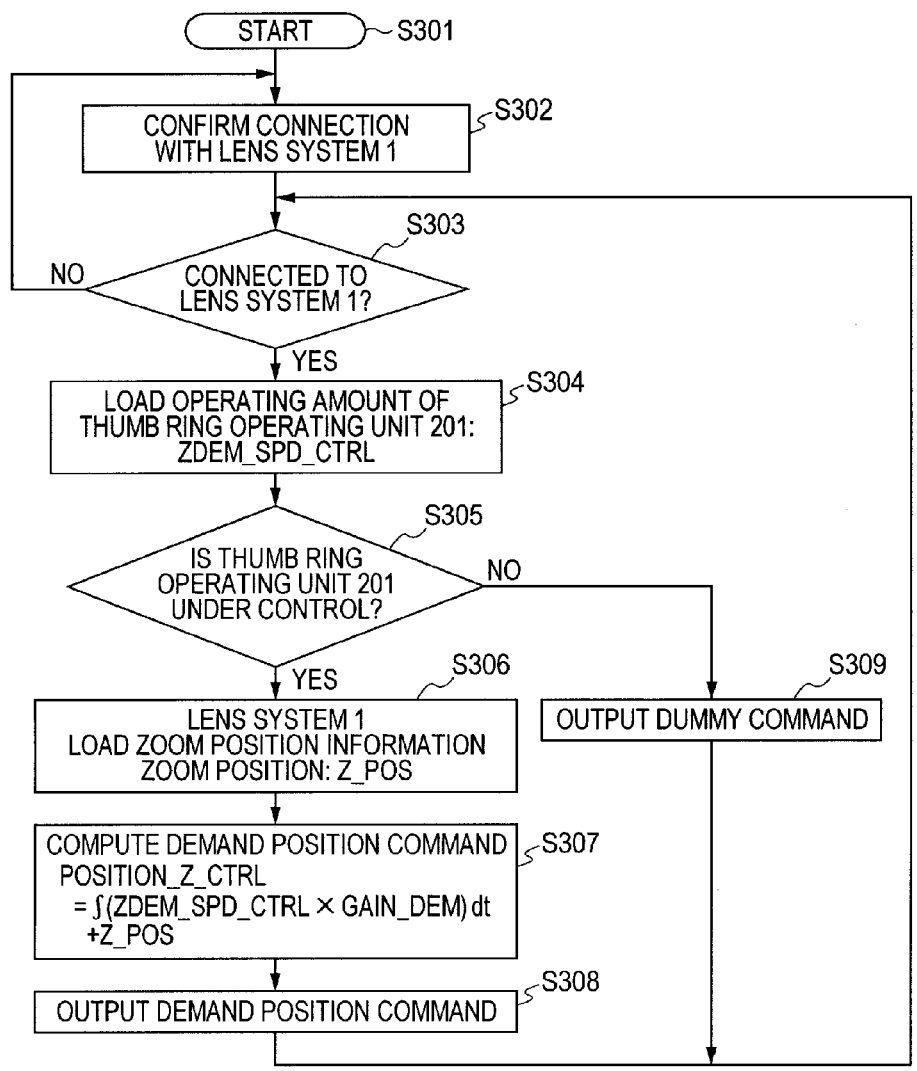
FIG. 3 is a flow chart of a zoom demand controller of the first embodiment.

FIG. 2 is an operation flow of the lens system 1, and FIG. 3 is an operation flow of the zoom demand controller 2. Note that, a flow of the shot box controller 3 is herein omitted. When the shot switch 302 is operated, the shot box controller 3 transmits, to the lens system 1, SHOT_Z_POS being a zoom target position and SHOT_Z_SPD being a driving speed, which are stored in the shot box controlling microcomputer 303 in advance. Further, it is assumed that a communication connection is always established between the lens system 1 and the shot box controller 3.

First, referring to FIG. 2, an operation flow of the lens controlling microcomputer 101 is described.

After a process is started in step S201, it is checked in step S202 whether or not a communication connection with the zoom demand controller 2 is established periodically. In this step, it is determined whether or not a command is input periodically from the zoom demand controller 2, and in the case of No, the process proceeds to step S203. On the other hand, in the case of Yes, after processing of returning an acknowledgment command (hereinafter, referred to as Ack command) (not shown), the process proceeds to step S205.

In the step S203, it is determined whether or not a connection command was received. The connection command is a command which is transmitted for the first time after the zoom demand controller 2 is connected to the lens system. In the case that the connection command has been received in the step S203, after the processing of returning the Ack command (not shown), a parameter used at the time of performing communication with the zoom demand controller 2 is initialized in step S204, and the process proceeds to step S205. On the other hand, in the case that the connection command has not been received in step S203, the process returns to step S202 until a communication connection is established. Note that, description hereinafter is based on the assumption that a communication connection with the zoom demand controller 2 is established, and that a command is received periodically from the zoom demand controller 2.

After determining a communication connection or the like is finished, in step S205, zoom position information is loaded by the zoom position detector 104 and is then set as Z_POS. Subsequently, it is determined in step S206 whether or not a zoom position inquiring command has been received from the zoom demand controller 2. In the case that the zoom position inquiring command has been received, the zoom position Z_POS is output as the Ack command for the zoom position inquiring command in step S207.

In step S208, it is determined whether or not a demand position command, which is position command information for commanding the position of the zoom lens, has been input, and in the case of Yes, the process proceeds to step S210. In the case of No, the process proceeds to step S209. In the step S210, a target position Z_POS_CTRL and a driving speed Z_SPD_CTRL, which are zoom command information, are set to a demand position commanding value POSITION_Z_CTRL and a predetermined maximum driving speed MAX_SPD, respectively. After that, the process proceeds to step S212.

In the step S209, it is determined whether or not a shot command has been input from the shot box controller 3. In the case of Yes, the process proceeds to step S211. In the case of No, the process proceeds to the step S212. In the step S211, the target position Z_POS_RL and the driving speed Z_SPD_CTRL, which are zoom driving information, are set to the command SHOT_Z_POS for the shot target position and the command SHOT_Z_SPD for speed at the time of shot driving, which are set by the operator in advance, respectively. After that, the process proceeds to the step S212.

After the commands from the respective controllers are each processed through the steps S208 to S211, in the step S212, a zoom driving amount Z_CTRL to be provided to the zoom driving unit 103 is computed. Specifically, the following computation is performed using the set target position Z_POS_CTRL, the set driving speed Z_SPD_CTRL and the zoom position Z_POS, $$Z\_CTRL=(Z\_POS\_CTRL-Z\_POS) \times GAIN \quad (1)$$

where GAIN represents a constant. Further, when Z_CTRL is larger than the driving speed Z_SPD_CTRL, a limit process is performed by forcibly setting the resultant of the formula (1) Z_SPD_CTRL.

In step S213, the zoom driving amount Z_CTRL is output to the zoom driving unit 103. Then, the zoom driving unit 103 drives the zoom lens 102 according to the zoom driving amount Z_CTRL.

After the step S213, the process returns to the step S202, and the series of steps in which the zoom lens 102 is moved according to the zoom operation continues to be carried out. The zoom lens is driven in response to a periodically received command, but when the thumb ring operating unit 201 is not being operated, the target position Z_POS_CTRL and the driving speed Z_SPD_CTRL are not updated. Thus, in the same state as the state updated through the previous process loop, the zoom driving amount is computed in the step S212, and the driving amount is output in the step S213. As a result, a driving command obtained through the previous process loop is maintained without any change.

Hereinafter, referring to FIG. 3, a process of the demand controlling microcomputer 202 of the zoom demand controller 2, which is a feature of this embodiment, is described.

After a process is started in step S301, an operation of confirming a communication connection with the lens system 1 is performed in step S302. Specifically, after outputting the connection command to the lens system 1, and confirming that the Ack command has been returned, the process proceeds to step S303. In the step S303, it is checked whether or not the communication connection with the lens system 1 is maintained. Specifically, after confirming a communication connection by means of the connection command, the zoom demand controller 2 stops outputting the connection command, and, after that onwards, determines whether or not the communication connection is maintained by checking whether or not the Ack command is transmitted from the lens system 1 in response to a zoom position command or a zoom speed command which has been output. When the Ack command is not input, the process returns to the step S302, and the confirmation of a communication connection is carried out again. When the Ack command is input, the process proceeds to step S304.

In the step S304, an operation amount ZDEM_SPD_CTRL of the thumb ring operating unit 201 is loaded. The thumb ring is an operating member which operates as follows: when not being operated, the operating member returns to a middle position (hereinafter, referred to as neutral position); when the operating member is operated to the left, the zoom position is moved to a telephoto side; and when the operating member is operated to the right, the zoom position is moved to a wide-angle side. Further, the thumb ring serves as a speed command input member which enables an operation of specifying a moving speed by using an operation amount by which the operating member is inclined from the neutral position. Accordingly, the information loaded in the step S304 takes such a value that changes in a range between ±maximum speeds with the speed at the neutral position set to 0 (the signs represent the respective directions).

Then, in step S305, it is determined whether or not the thumb ring operating unit 201 is being operated. As a result of the determination, when it is determined that the thumb ring operating unit 201 is being operated, the process proceeds to step S306. As a criterion for determining whether or not the thumb ring operating unit 201 is being operated, it may be determined whether or not the operation amount ZDEM_SPD_CTRL of the thumb ring is a neutral value. Further, the determination regarding the operation may be made by adding, to the neutral value, minor values with which the lens is not driven, thereby specifying a dead-band. Further, the determination may be made by providing a sensor for detecting that an object is in contact with the operating member, such as a pressure-sensitive sensor or a fingerprint sensor.

In the step S306, the demand controlling microcomputer 202 outputs an inquiring command for a current zoom position to the lens system 1. Then, the demand controlling microcomputer 202 receives the returned zoom position information Z_POS, and, in step S307, computes the demand position commanding value POSITION_Z_CTRL, which is the position command information, based on the position information by using the following equation, $$POSITION\_Z\_CTRL=\int(ZDEM\_SPD\_CTRL \times GAIN\_DEM)dt+Z\_POS \quad (2)$$

GAIN_DEM: constant

Specifically, the operation amount ZDEM_SPD_CTRL of the thumb ring is integrated with respect to a unit time, to thereby compute a relative position commanding value. Then, the demand position commanding value POSITION_Z_CTRL is computed by adding the relative position commanding value to the current zoom position Z_POS. Note that, in this embodiment, the position information Z_POS of the zoom lens 102 is loaded, but the computation may be performed without adding the position information Z_POS. Alternatively, instead of the position information Z_POS, the target position Z_POS_CTRL obtained from the lens system 1, which is the driving amount information, may be used.

Then, in step S308, the computed demand position commanding value POSITION_Z_CTRL is output as the demand position command to the lens system 1, and the process returns to the step S303, thereby, the series of steps in which the zoom command is output according to the zoom operation continues to be carried out.

On the other hand, when it is determined in the step S305 that the thumb ring operating unit 201 is not being operated, a command for driving the zoom lens is not output to the lens system 1, and the process proceeds to step S309, in which a dummy command, which is not the position command information, is output. The dummy command is output when the thumb ring operating unit 201 is not being operated, in the process performed in the lens controlling microcomputer 101 illustrated in FIG. 2, hence the initialization of communication data performed in the step S204 does not need to be carried out each time. Therefore, speedy concurrent operation of external controllers can be achieved. In this embodiment, the dummy command is a command other than the demand position command. For example, a demand speed command, in which a speed commanding value is zero, or the connection command, which is transmitted when the zoom demand controller 2 is connected to the lens system 1, may be used, but the dummy command is not limited thereto.

Subsequently, the process returns to the step S303, and the series of steps in which the zoom command is output according to the zoom operation continues to be carried out.

Referring back to FIGS. 1 to 3, the following case is described only for key points. That is, in the system which operates as described above, after moving the zoom lens by using the zoom demand controller 2, the operator performs an operation of further moving the zoom lens to a preset position by using the shot box controller 3.

First, communication connections are established between the zoom demand controller 2 and the lens system 1 and between the shot box controller 3 and the lens system 1, respectively. In this state, the thumb ring operating unit 201 is not being operated, and hence the demand controlling microcomputer 202 outputs the dummy command through the step S309 as a result of the determination regarding the operation state which is made in the step S305 of FIG. 3. Here, it is assumed that, as the dummy command, a demand speed command SPEED_Z_CTRL whose value is zero is output. Owing to this, in the step S202 of FIG. 2, the command is received periodically, and hence the lens controlling microcomputer 101 advances the process to the step S205. Therefore, the process of initializing the communication data performed in the step S204 can be avoided. After that, in the determination in the step S208 or S209, it is determined that there is no input, and hence, consequently, the process is advanced without updating the target position Z_POS_CTRL, which is a zoom commanding value, and the driving speed Z_SPD_CTRL. In other words, the output of the zoom driving amount used for moving the zoom lens 102 indicates the current position, and hence the zoom lens 102 remains in a stopped state.

Hereinafter, when the operator operates the thumb ring operating unit 201, the demand controlling microcomputer 202 performs the steps S306 to S308 depending on the determination regarding the operation state is made in the step S305 illustrated in FIG. 3, thereby outputting the demand position command POSITION_Z_CTRL. The lens controlling microcomputer 101 detects the demand position command POSITION_Z_CTRL in the step S208 of FIG. 2. Then, in the step S210, the lens controlling microcomputer 101 sets the demand position command POSITION_Z_CTRL as the target position Z_POS_CTRL, which is the zoom commanding value, and sets the maximum driving speed MAX_SPD as the driving speed Z_SPD_CTRL. In the step S212, the zoom driving amount Z_CTRL is computed using those values, to thereby move the zoom lens 102. This process is always performed while the operator is operating the thumb ring operating unit 201, which therefore enables the lens to be moved at a speed corresponding to the operation amount. Further, even if the shot switch 302 of the shot box controller 3 is operated while the thumb ring operating unit 201 is being operated, the input of the demand position command is given priority in the determination in the step S208, and hence the shot operation performed by operating the shot switch 302 is made ineffective.

Further, the operator stops operating the thumb ring operating unit 201, hence the command outputting of the zoom demand controller 2 returns, through the step S305, to the process of outputting the dummy command of the step S309. Then, every time the shot switch 302 is operated, the shot command is output from the shot box controller 3. In the case that the lens system 1 has received the dummy command from the zoom demand controller 2, and the shot command from the shot box controller 3, respectively, the determination is No in the step S208, and the process proceeds to the step S209. In the step S209, it is determined that the shot command has been input, and the process proceeds to the step S211. Then, the shot command is set as the zoom command, and the process proceeds to the step S212. In the step S212, the zoom driving amount Z_CTRL is computed by using the zoom command for which the shot command has been set, and is then output to the zoom driving unit 103 in the step S213. In other words, the zoom lens 102 is moved according to the operation of the shot box controller 3.

With the above-mentioned configuration, even if multiple lens systems are operated through one zoom demand controller, an error in lens moving speed between the lens systems can be suppressed, and also, lens operation using the shot command from the shot box controller can be performed.

Note that, in this embodiment, the description has been given by taking the zoom as an example, but this technology may be used for a combination of, for example, a focus demand controller and a shot box controller having a zoom demand function. Further, a combination of the shot box controller and the demand controller may be arbitrary. For example, a controller, which is used by an operator near an image taking apparatus, and a similar controller, which is used by a lens operator at a remote location, may be connected to the lens system.

The important point is that, in any situation in which at least one controller which outputs a position commanding signal to the lens system at least in a period in which the controller is being operated is connected to the lens system, the technology of the present invention enables the concurrent operation without providing a changeover unit.

Second Embodiment

A feature of this embodiment is that, in an image taking system having the configuration of FIG. 1, when an operation receives from one controller connected to the lens system 1, a commanding value is output as a matching command to another controller. Then, when a controller receives the matching command, the controller performs a predetermined task, thereby realizing the concurrent operation of multiple controllers. The matching command is a command for transmitting, when an efficient controller is changed, zoom and focus commands from the lens system 1 to the respective controllers. Further, each controller which has received the matching command takes into account its command information, and determines whether or not a commanding signal can be computed and output. Further, this embodiment also provides, as a feature thereof, a configuration in which when the lens system 1 is being driven according to an operation from another controller at the time of the concurrent operation, display is performed on a controller to provide a notification that the operation of the controller is disabled.

Figure 4:
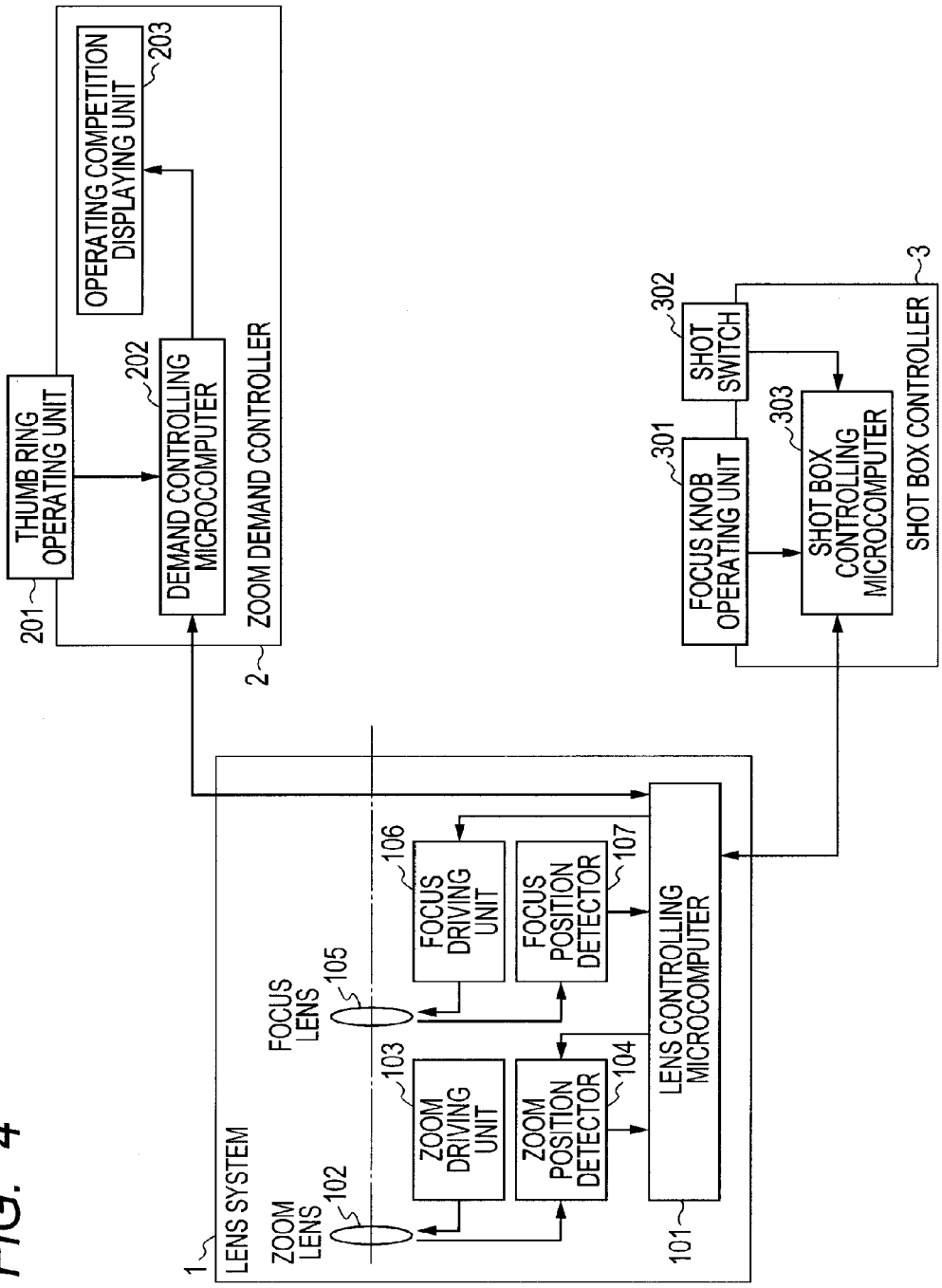
FIG. 4 is a block diagram of a second embodiment.

FIG. 4 is a configuration diagram illustrating an image taking system which best represents a feature of the second embodiment. The same components as those in FIG. 1 are denoted by the same reference symbols. In response to an instruction from a demand controlling microcomputer 202, an operating competition displaying unit 203 performs display on a zoom demand controller 2 to indicate that the operation of another controller is enabled.

Figure 5:
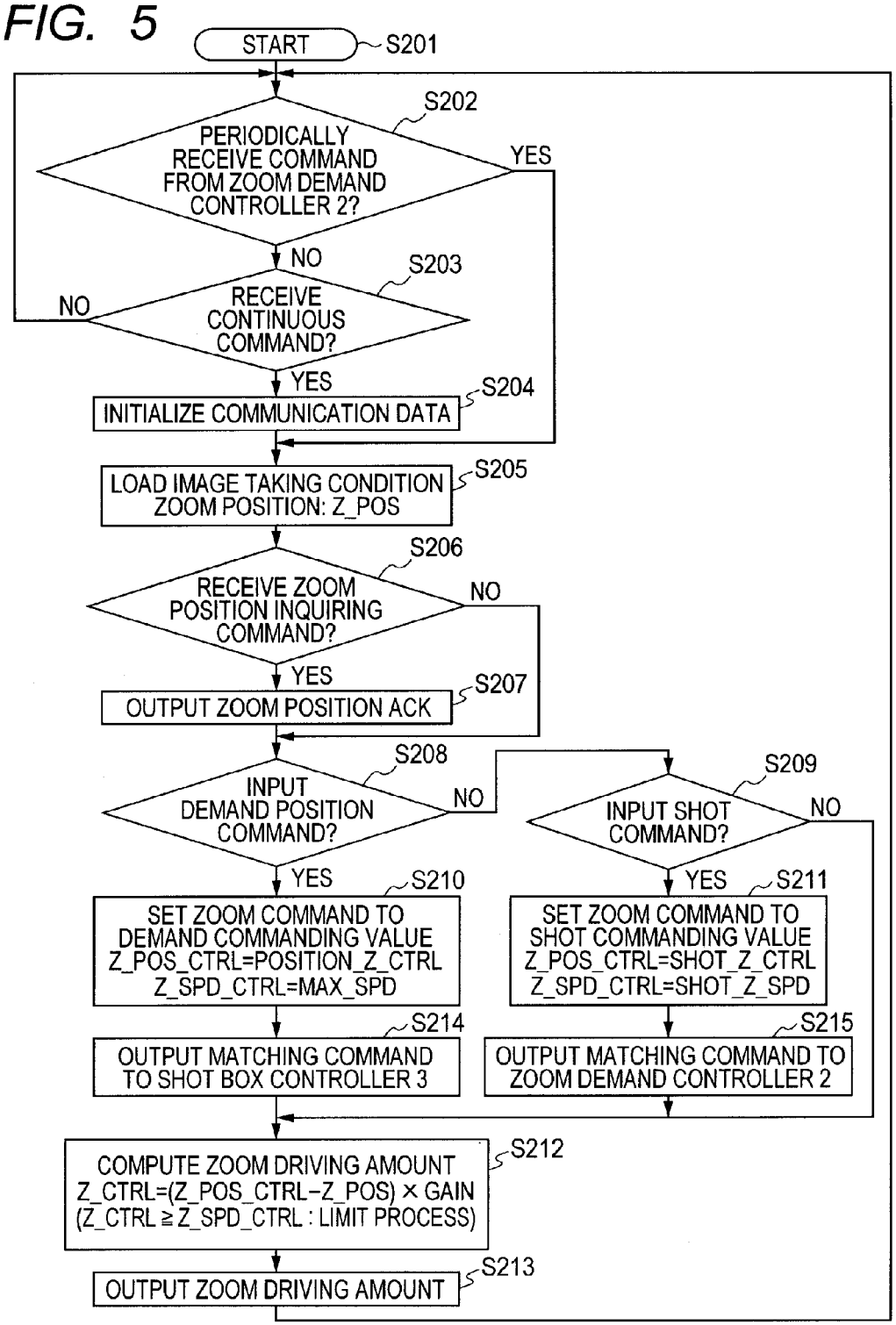
FIG. 5 is a flow chart of a lens system of the second embodiment.
Figure 6:
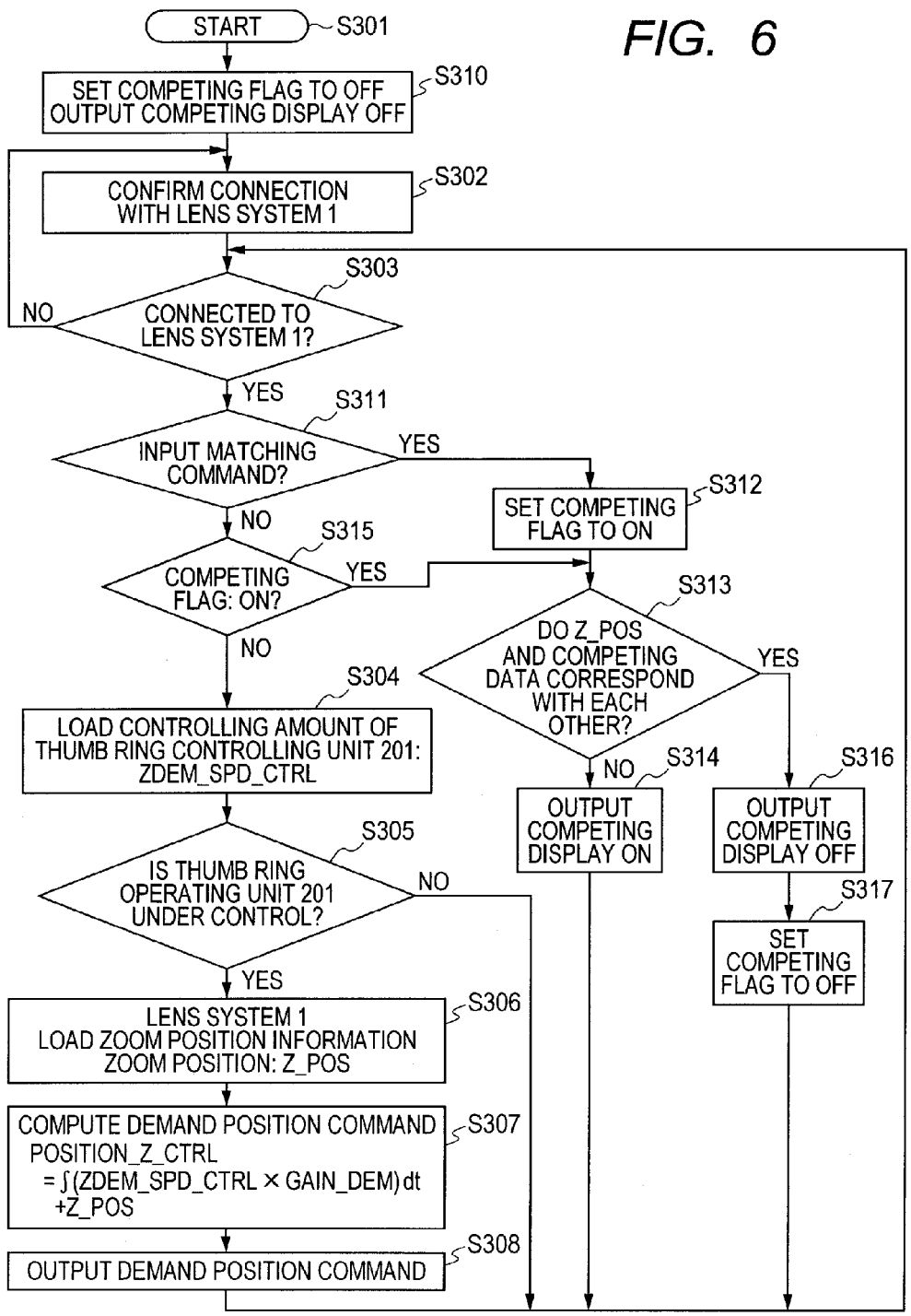
FIG. 6 is a flow chart of a zoom demand controller of the second embodiment.

FIG. 5 is a flow chart of the lens controlling microcomputer 101 of the lens system 1, and FIG. 6 is a flow chart of the demand controlling microcomputer 202 of the zoom demand controller 2. Referring to FIGS. 4 to 6, operation of the second embodiment is described. Note that, as for FIGS. 4 to 6, portions described in the first embodiment are given the same number, and description thereof is herein omitted.

First, referring to FIG. 5, operation of the lens controlling microcomputer 101 of the lens system 1 is described.

In step S208, when it is determined that the demand position command has been input, similarly to the first embodiment, the demand position command POSITION_Z_CTRL is set as the target position Z_POS_CTRL, which is the zoom command, in the step S210. The process proceeds to step S214, in which the position command POSITION_Z_CTRL, which is the demand position commanding value, is output as the matching command to the shot box controller 3. Subsequently, the process proceeds to the step S212, and after that onwards, process similar to that of the first embodiment is performed.

On the other hand, in the step S209, in the case that the shot command has been input from the shot box controller 3, similarly to the first embodiment, the target position Z_POS_CTRL, which is the zoom command, is set to the shot commanding value SHOT_Z_POS in the step S211. Then, the process proceeds to step S215, in which the matching command is output to the zoom demand controller 2. Subsequently, the process proceeds to the step S212, and after that onwards, process similar to that of the first embodiment is performed.

When it is determined in the step S209 that the shot command has not been input from the shot box controller 3, similarly to the case of the first embodiment, the target position Z_POS_CTRL and the driving speed Z_SPD_CTRL are not updated, and the process proceeds to the step S212.

Hereinafter, referring to FIG. 6, operation of the demand controlling microcomputer 202 of the zoom demand controller 2 is described.

After process is started in the step S301, as initialization process, in step S310, a competing flag FLAG_A for indicating an operation period of another controller is set to OFF, and an output to the operating competition displaying unit 203 for performing display indicating that the operation of another controller is enabled is set to display OFF. Then, the process proceeds to a normal operation flow of the step S302 and the subsequent steps. After it is determined in the step S303 that a communication connection with the lens system 1 is maintained, the process proceeds to step S311.

In the step S311, it is determined whether or not the matching command has been input from the lens system 1. In the case of Yes, the process proceeds to step S312. In the case of No, the process proceeds to step S315.

In the step S312, the competing flag FLAG_A is set to ON, and the process proceeds to step S313.

In the step S313, it is determined whether or not a difference value between a position commanding value set by another controller (in this embodiment, shot position commanding value SHOT_Z_POS), which is provided by means of the matching command, and the zoom position information Z_POS is zero, or whether or not the difference value falls within a given range. In the case that the difference value falls outside the given range, it is determined that the lens system 1 is driving the zoom lens 102 according to the shot command, and, in step S314, a display ON instruction is output to the operating competition displaying unit. After that, the process returns to the step S303.

Then, in the subsequent repetitive process, when there is no input of the matching command again in the step S311, the process proceeds to the step S315. In the step S315, a determination is made with regard to the status of the competing flag FLAG_A. The current status of the flag is ON, and thus the process proceeds to the step S313, in which a determination is made again with regard to the difference value between the shot position commanding value SHOT_Z_POS and the zoom position information Z_POS. When the difference value is zero or falls within the given range, it is determined that the driving of the zoom lens 102 according to the shot command is completed, and the process proceeds to step S316, in which a display command to the operating competition displaying unit 203 is output as OFF. Further, in step S317, the competing flag FLAG_A is set to OFF, and the process returns to the step S303.

When the process enters into repetitive process in this state, through the determining steps of the steps S311 and S315, the process proceeds to the step S304, and the process of outputting a demand command is sequentially executed. This enables the zoom lens 102 of the lens system 1 to be driven through the operation of the zoom demand controller 2.

The configuration described above enables a controller to make a determination with regard to the operation state of another controller, and also enables the operator to recognize the operation state through display.

In this embodiment, the lens system 1 outputs the matching command, which allows a determination to be made with regard to the operation state of another controller. However, the above-mentioned determination may be made by monitoring change in zoom position information Z_POS and the commanding value output by the controller itself.

Further, the description has been given by taking as an example the case where the lens system 1 transmits the commanding signal as the matching command, but the position information may be transmitted as the matching command.

The operating competition displaying unit 203 may perform the display by lighting-up, blinking or the like. Alternatively, the commanding value or the position information obtained through the input matching command may be displayed.

Third Embodiment

A feature of this embodiment is that, in an image taking system having the configuration of FIG. 1, when the thumb ring operating unit 201 of the zoom demand controller 2 connected to the lens system 1 is not being operated, the communication connection is cut off so as to enable operation performed through another controller.

Figure 7:
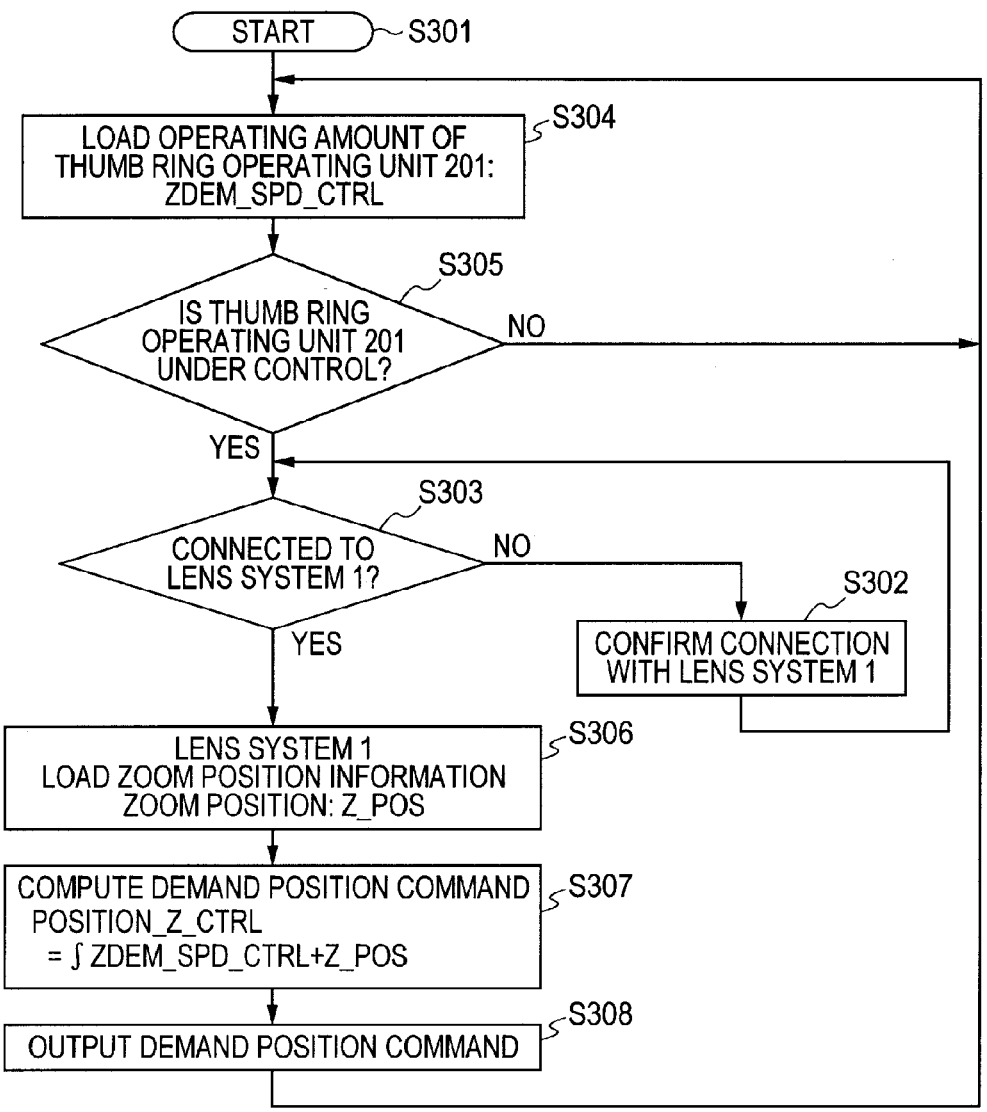
FIG. 7 is a flow chart of a zoom demand controller of a third embodiment.

FIG. 7 is a flow chart of the demand controlling microcomputer 202 of the zoom demand controller 2 according to this embodiment. Note that, a block configuration diagram and a flow chart of the lens controlling microcomputer of this embodiment are the same as in FIG. 1 and FIG. 2, respectively, having the same configuration as in the first embodiment, and hence description thereof is herein omitted. Operation of the zoom demand controller 2 is described.

Referring to FIG. 7, in the step S305, a determination is made with regard to the operation state of the thumb ring operating unit 201. When the thumb ring operating unit 201 is being operated, the process proceeds to the step S303, in which it is checked whether or not the connection with the lens system 1 is maintained. When there is no communication therebetween, the process of confirming a connection is performed in the step S302, and after a connection is confirmed, the process of outputting the zoom position command performed in the step S306 and the subsequent steps is performed. On the other hand, when it is determined in the step S305 that the thumb ring operating unit 201 is not being operated, the process does not go any further, that is, the process returns to the step S304 without outputting any command.

In this embodiment, when the thumb ring operating unit 201 is not being operated, the lens controlling microcomputer 101 does not receive any command. Accordingly, because the command is not periodically received from the zoom demand controller 2, it is determined in the step S202 that the communication connection is in a cut-off state, and the process proceeds to the step S203 to wait for a connection to be established. Until the communication connection with the zoom demand controller 2 is reestablished, there is no input from the zoom demand controller 2, and only an input from the shot box controller 3 is received to compute the zoom driving amount Z_CTRL.

This configuration enables the concurrent operation of external controllers.

Fourth Embodiment

A feature of this embodiment is to enable concurrent operation with another controller by using a zoom demand controller 2a which operates the zoom lens 102 by transmitting an analog signal to a lens system 1a.

Figure 8:
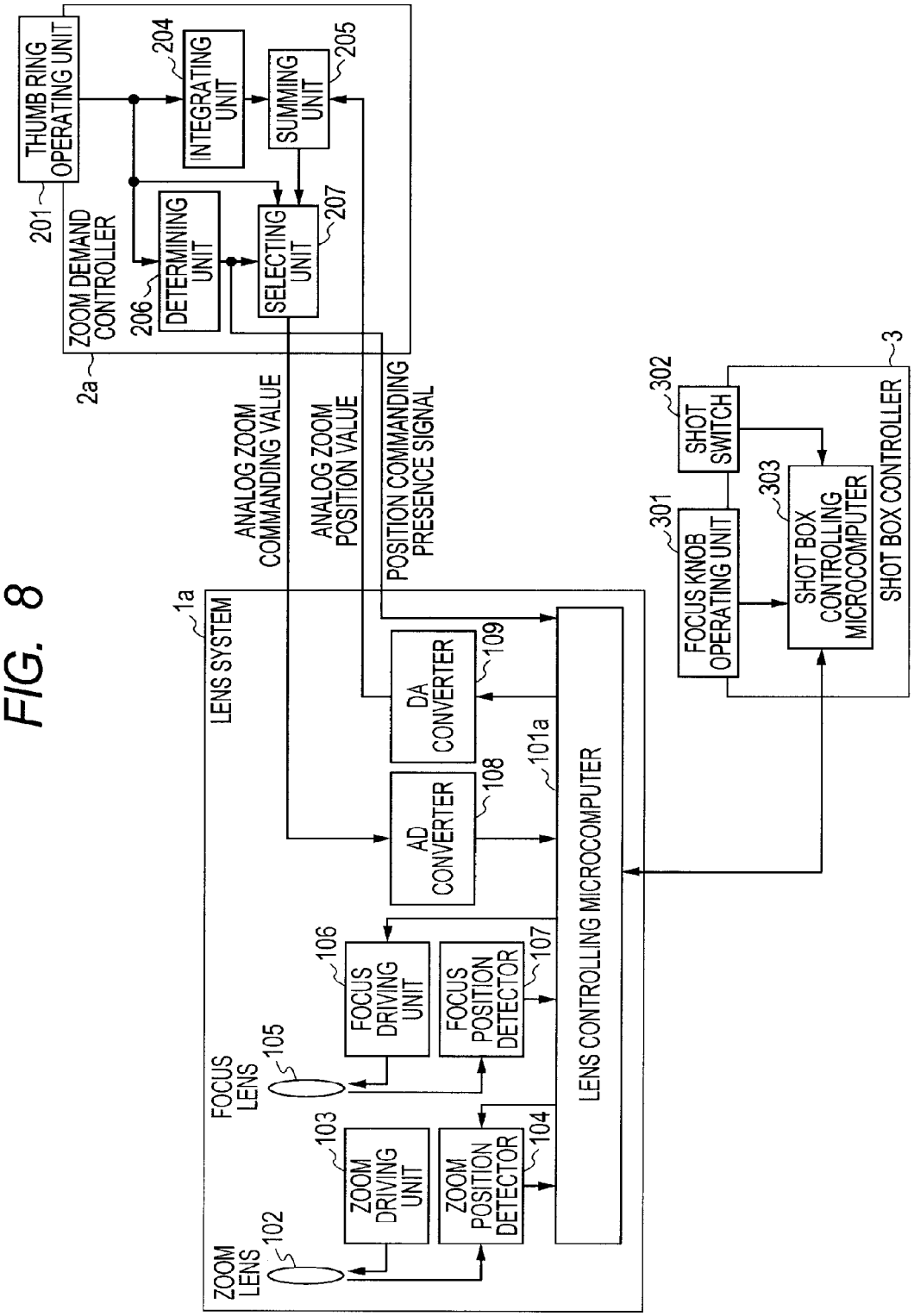
FIG. 8 is a block diagram of a fourth embodiment.

FIG. 8 is a configuration diagram of an image taking system. In the lens system 1a of FIG. 8, an AD converter 108 converts an analog zoom command ANA_Z_CTRL input from the zoom demand controller 2a into digital data. A DA converter 109 converts the zoom position information Z_POS output from a lens controlling microcomputer 101a into analog data. Further, the lens controlling microcomputer 101a receives a position command presence signal which is output from the zoom demand controller 2a.

Further, the zoom demand controller 2a includes: an integrating unit 204 for integrating the operation amount of the thumb ring operating unit 201 with respect to a unit time; and a summing unit 205 for summing the zoom position information Z_POS from the lens system 1a and a relative position commanding value SUM_POS output from the integrating unit.

A determining unit 206 such as a comparator determines whether or not the operation amount of the thumb ring operating unit 201 indicates the neutral position, or whether or not the operation amount of the thumb ring operating unit 201 falls within the neutral range (whether or not the thumb ring operating unit 201 is being operated), and then outputs a result of the determination to the lens controlling microcomputer 101a as the position command presence signal. Based on the position command presence signal from the judging unit 206, a selecting unit 207 selects one of the speed commanding value from the thumb ring operating unit 201 and the position commanding value which is a result obtained from the summing unit 205, and then outputs the selected value to the lens system 1a.

First, operation of the zoom demand controller 2a is described.

The output of the thumb ring operating unit 201 is input to the integrating unit 204 for generating a position command, is also input to the determining unit 206 for determining whether or not the thumb ring operating unit 201 is being operated, and is further input to the selecting unit 207 as an analog speed commanding value. The integrating unit 204 integrates the operation amount of the thumb ring operating unit 201 with respect to a unit time, to thereby generate a relative position command. This output is further added to the zoom position Z_POS by the summing unit 205, to thereby generate a position commanding signal. The generated position command is output to the selecting unit 207. Further, the judging unit 206 converts the operation amount of the thumb ring operating unit 201 which has been input thereto into a level signal indicating whether or not the operation amount is at the neutral level, or whether or not the operation amount falls within the neutral range including the dead-band, and then outputs, as the position command presence signal, the level signal to the lens controlling microcomputer 101a and the selecting unit 207. Based on the status of the position command presence signal, the selecting unit 207 selects one of the position commanding signal and the speed commanding signal which have been input thereto, and then outputs the selected signal to the AD converter 108 of the lens system 1a. In other words, the selecting unit 207 outputs a signal for identifying whether or not the thumb ring operating unit 201 is being operated.

Figure 9:
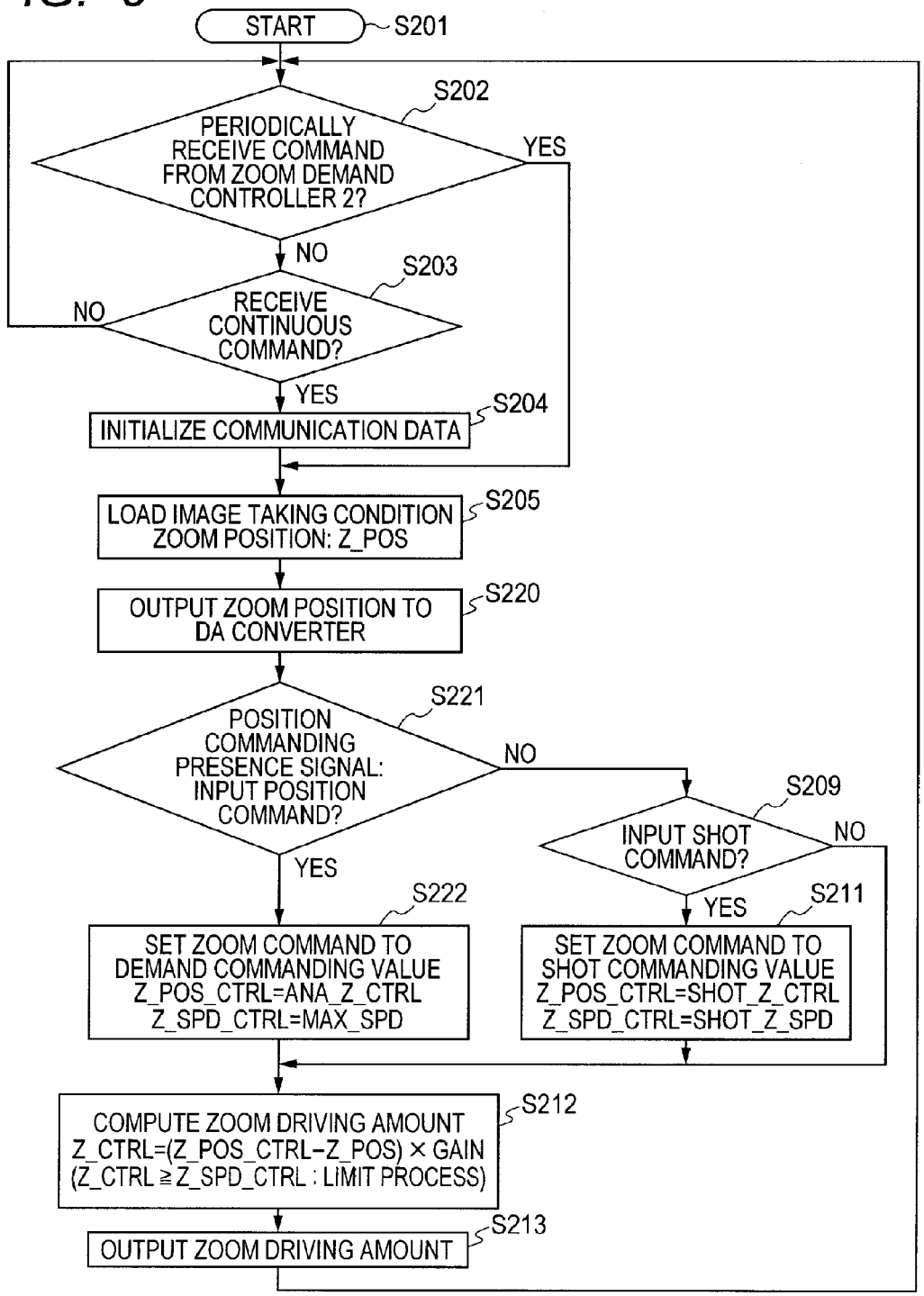
FIG. 9 is a flow chart of a lens system of the fourth embodiment.

Hereinafter, referring to FIG. 9, an operation flow of the lens system 1a is described.

After process is started in the step S201, the zoom position Z_POS is read from the zoom position detector 104 in the step S205. After that, in step S220, the zoom position Z_POS is output to the DA converter 109. Then, the zoom position Z_POS is provided to the summing unit 205 of the zoom demand controller 2a via the DA converter 109. After the process of the step S220, the process proceeds to step S221.

In the step S221, a determination is made about the position command presence signal provided from the zoom demand controller 2a. When there is an input of the position command, the process proceeds to step S222, and otherwise, proceeds to the step S209.

When it is determined in the step S209 that the shot command has been input, the process proceeds to the step S211, in which the target position Z_POS_CTRL and the driving speed Z_SPD_CTRL, which are the zoom command information, are set to the shot commanding values SHOT_Z_CTRL and SHOT_Z_SPD, respectively. After that, the process proceeds to the step S212. Further, when it is determined in the step S209 that the shot command has not been input, the process proceeds to the step S212.

On the other hand, in the step S222, the position commanding signal is set. Specifically, the target position Z_POS_CTRL and the driving speed Z_SPD_CTRL, which are the zoom command information, are set to the demand position commanding value ANA_Z_CTRL and the predetermined maximum driving speed MAX_SPD, respectively.

After that, the process proceeds to the steps S212 and S213, thereby computing the zoom driving amount Z_CTRL, which is then output to the zoom driving unit 103.

After that, the process returns to the step S205, and the repetitive process is performed.

With the configuration described above, while the thumb ring operating unit 201 is not being operated, the zoom demand controller 2a is connected using the speed command which has its speed commanding value as zero.

This means that the speed command from the zoom demand controller 2a according to this embodiment corresponds to the dummy command output from the demand controlling microcomputer 202 in the step S309 according to the first embodiment. Therefore, in the process performed in the lens controlling microcomputer 101a, the initialization of the communication data in the step S204 does not need to be carried out every time, and thus speedy concurrent operation of external controllers can be performed. Accordingly, there can be achieved such a speedy changeover operation that does not allow control from the shot box controller 3 to be accepted while the thumb ring operating unit 201 is being operated, and allows the control to be accepted while the thumb ring operating unit 201 is not being operated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-112325, filed May 14, 2010, which is hereby incorporated by reference herein in its entirety.

What is claimed is:

1. An image taking system, comprising:
a lens apparatus;
a first operating apparatus; and
a second operating apparatus,
wherein the first operating apparatus and the second operating apparatus each are configured to output a command information for driving an optical member which is movable and is included in the lens apparatus,
wherein the lens apparatus comprises:
a driving unit configured to drive the optical member;
a lens controller configured to control the driving unit based on the command information from the first operating apparatus and the second operating apparatus; and
a position detector configured to detect a position of the optical member,
wherein the first operating apparatus comprises:
an operating unit operable by an operator; and
a demand controller configured to output, to the lens controller, information for driving the optical member based on an operation amount of the operating unit,
wherein the demand controller cuts off a communication connection with the lens controller when the operating unit is not being operated, and outputs position command information for the optical member to the lens controller based on the operation amount of the operating unit after the communication connection with the lens controller is established when the operating unit is being operated,
wherein the demand controller generates the position command information based on a position of the optical member detected by the position detector and the operation amount of the operating unit,
wherein, when the optical member is driven based on position command information from the second operating apparatus, the lens controller outputs the position command information from the second operating apparatus to the demand controller of the first operating apparatus, and
wherein the demand controller does not generate the position command information when a difference between the position command information from the second operating apparatus and the position of the optical member detected by the position detector falls outside a predetermined range.

2. An image taking system according to claim 1, wherein:
the first operating apparatus further comprises a displaying unit for displaying that the optical member is being driven according to the command information from the second operating apparatus, and
the demand controller causes the displaying unit to display an information indicating whether or not the difference between the position command information from the second operating apparatus and the position of the optical member detected by the position detector falls within the predetermined range.

* * * * *